United States Patent Office 3,304,271
Patented Feb. 14, 1967

3,304,271
SILANOL CONDENSATION USING TETRACYANO-ETHYLENE AS A CATALYST
Ronald H. Baney, Midland, Mich., assignor to Dow Corning Corporation, Midland, Mich., a corporation of Michigan
No Drawing. Filed Feb. 15, 1965, Ser. No. 432,900
4 Claims. (Cl. 260—2)

This application relates to a new condensation catalyst for silanol groups which has the advantage of being entirely inert toward siloxane bonds.

The condensation of silanol groups plays a significant role in the formation of siloxanes from silanols, and the curing of room temperature vulcanizing silicone rubbers and silicone resins.

The condensation proceeds in the following manner:

$$2 \equiv SiOH \rightarrow \equiv SiOSi \equiv + H_2O$$

Many silanol condensation catalysts are known, but a large number (e.g., sodium hydroxide) are "bond-rearranging," i.e., they cause siloxane bonds to rupture and rearrange to form new siloxane bonds. It is not possible to make silicones of definite structure with such bond-rearranging catalysts since the random rearrangement of siloxane bonds will necessarily occur in their presence.

The catalyst of this invention rearranges only strained siloxane and strained silazane bonds to a considerable degree. It is inert toward other siloxane bonds. Examples of strained siloxane bonds are shown immediately below.

This application relates to a method for polymerizing organosilicon compounds which comprises contacting (1) a compound selected from the group consisting of

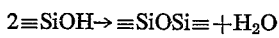

$(R_2SiO)_3$, and an organosilicon compound having an average per silicon atom of 1 to 3 monovalent aliphatic hydrocarbon substituent groups and at least one $\equiv SiOH$ group per molecule, any remaining valences of said organosilicon compound being satisfied with substituents selected from the group consisting of divalent oxygen atoms and divalent hydrocarbon radicals, with (2) tetracyanoethylene, where R is a monovalent aliphatic hydrocarbon radical.

A particularly useful embodiment of this invention can be found in a method of polymerizing organosilicon compounds containing silicon-bonded hydroxyl radicals, which method comprises contacting (1) an organosilicon compound having an average per silicon atom of 1.98 to 2.00 monovalent aliphatic hydrocarbon substituent groups and an average per molecule of two $\equiv SiOH$ groups, any remaining valences of said organosilicon compound being satisfied with substituents selected from the group consisting of divalent oxygen atoms and divalent hydrocarbon radicals, with (2) tetracyanoethylene.

Polymers of especially high molecular weight can be produced by the process of this invention, since the newly-formed siloxane bonds of the polymers cannot be reopened by the catalyst.

R can be any monovalent, aliphatic hydrocarbon radical, e.g., alkyl and cycloalkyl radicals such as methyl, ethyl, isobutyl, cyclohexyl, 2-ethylhexyl, and octadecyl; and unsaturated radicals such as vinyl, allyl, cyclopentenyl, 3-vinyldecyl, and 4-hexenyl.

The hydroxylated organosilicon compound used in this invention can be substituted with any of the groups listed as examples of R above. Furthermore, any divalent hydrocarbon substituent can be used as silicon substituents, e.g., methylene, propylene, cyclohexylene, vinylene, 2-ethylhexylene, dodecylene or phenylene.

Any hydroxylated organosilicon compound of the above description is suitable for use in this invention. Examples are $(C_3H_7)_3SiOH$,

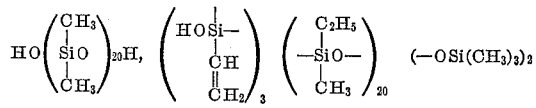

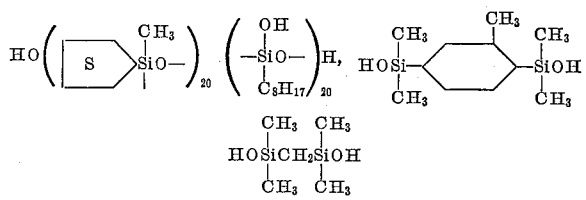

and partial hydrolyzates of hydrolyzable silanes such as $CH_3Si(OCH_3)_3$, $(C_4H_9)_3SiOCH_3$,

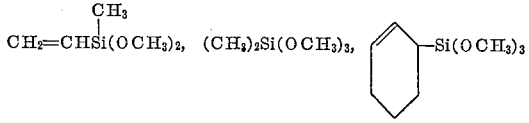

and mixtures thereof.

The reaction temperature and time is not critical, nor is there any limit to the amount of catalyst (tetracyanoethylene) that can be used. It is preferred, however, to operate the reaction at a temperature of 15° to 200° C. in order to obtain a practical rate of reaction with little or no siloxane bond rearrangement. It is also preferred to use from 0.1 to 10 weight percent of tetracyanoethylene, based on the weight of ingredient (1).

It has been determined that the rate of reaction is partially dependent on the average degree of aliphatic hydrocarbon substitution on the hydroxyl-bonded silicon atoms.

The fastest reaction occurs when three hydrocarbon groups are bonded to each hydroxyl-bonded silicon atom, and a slower reaction occurs when an average of one or less hydrocarbon groups is so attached.

The two ingredients of the process of this invention can be combined without the presence of any other additives, or a solvent can be added to the system to improve the dispersability of one or both ingredients. Oxygenated solvents such as ethanol, isopropanol, acetone, methylethylketone, diethylether, acetonitrile and tetrahydrofuran are generally most suitable for this purpose, though other solvents which are compatible with one or both of ingredients (1) and (2) can be operative.

The products of this invention are useful as resins, as gums for preparing silicone elastomers, and for other known uses for silicone high polymers.

The following examples are illustrative only and should not be construed as limiting the invention which is properly delineated in the appended claims.

Example 1

To 15 g. of trimethylsilanol there was added 0.1 g. of tetracyanoethylene. The mixture was shaken and allowed to stand at room temperature. After 15 minutes the mixture became cloudy with water droplets, indicating that condensation was taking place.

After 16 hours the mixture was analyzed. No detectable amount of trimethylsilanol remained. The product was hexamethyldisiloxane.

Example 2

To 15 g. of a hydroxyl-endblocked dimethylpolysiloxane fluid having a viscosity of 54 cs. at 25° C., there was added 0.1 g. of tetracyanoethylene. The mixture was allowed to stand for 16 hours. It was noted that the tetracyanoethylene did not disperse well in the siloxane.

The mixture was then warmed for 24 hours at about 50° C. The viscosity of the mixture increased markedly, and a tough, rubbery film had formed on the surface, which film was a polymer of the hydroxyl-endblocked siloxane fluid.

Example 3

To 19.9 g. of a hydroxyl-endblocked dimethylpolysiloxane fluid having approximately a 4 percent hydroxyl content and a viscosity of about 50 cs. at 25° C. there was added 0.25 g. of tetracyanoethylene dissolved in 7 cc. of isopropanol.

This was placed in a container and heated for three hours at 150° C. to yield a viscous composition having a viscosity of several thousand cs.

A control sample of the above composition was similarly tested, there having been no tetracyanoethylene added. The viscosity at the end of the three hours of heating was approximately one-half that of the sample that contained tetracyanoethylene.

Example 4

To 20.2 g. of a hydroxyl-endblocked dimethylpolysiloxane fluid having approximately a 2 percent hydroxyl content there was added 7.9 g. of

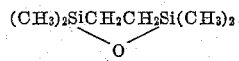

A spontaneous reaction occurred between the silanol groups of the first ingredient, and the second ingredient, yielding a hydroxylated condensation product containing

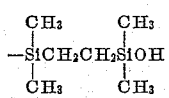

To this material there was added about one weight percent of tetracyanoethylene, with agitation.

The mixture was allowed to stand at room temperature for 15½ hours. The mixture had thickened from the viscosity of a light oil to the viscosity of molasses.

The mixture was then heated at 150° C. for 15 minutes to yield a gummy polymer.

Example 5

To 1 ml. of

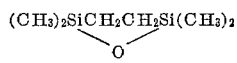

there was added 0.1 g. of tetracyanoethylene.

This was allowed to stand at room temperature for 6 hours to yield a sticky, viscous polymer.

Example 6

To 1 ml. of

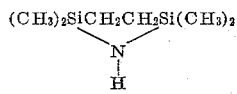

there was added 0.1 g. of tetracyanoethylene. This was allowed to stand for 20 minutes to yield a sticky, viscous polymer.

Example 7

When the following amounts of tetracyanoethylene are added to 20 g. of each of the following cyclic materials, an increase in viscosity is noted:

| Grams of (CN)$_2$C=C(CN)$_2$ | Cyclic Material | Reaction time and temp. |
| --- | --- | --- |
| 0.1 | CH$_3$CHCH$_2$SiCH$_2$CH$_2$SiCH$_2$CHCH$_3$ with C$_2$H$_5$ groups and N—H bridge | 1 hr. at 30° C. |
| 0.5 | C$_{12}$H$_{25}$SiCH$_2$CH$_2$SiC$_{12}$H$_{25}$ with CH$_2$=CH groups and N—H bridge | 1 hr. at 40° C. |
| 1.0 | cyclic structure with S, SiCH$_2$CH$_2$Si, CH$_3$, O | 5 hrs. at 70° C. |
| 2.0 | [(CH$_3$)$_2$SiO]$_3$ | 18 hrs. at 100° C. |
| 2.5 | (C$_6$H$_{13}$SiO)$_3$ with CH$_3$ | 18 hrs. at 90° C. |

Example 8

When 5 g. of the partial condensate of hydrolyzed methyltrimethoxysilane is mixed with 30 g. of

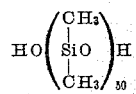

and 2 g. of tetracyanoethylene, heating at 70° C. for 4 hours will yield a tough, elastomeric polymer.

Example 9

When 5 g. of

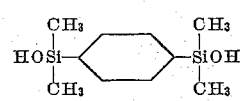

is mixed with 0.1 g. of tetracyanoethylene, a gummy polymer is formed in 5 hours at 50° C.

Example 10

When 5 g. of the partial condensate of a hydrolyzed mixture of 5 parts by weight of hexyltrimethoxysilane, 5 parts of dimethyldimethoxysilane, and 1 part of vinylmethyldimethoxysilane is mixed with 0.1 g. of tetracyanoethylene, a resinous material is formed after 8 hours of heating at 70° C.

That which is claimed is:

1. A method for polymerizing organosilicon compounds which comprises contacting (1) a compound selected from the group consisting of

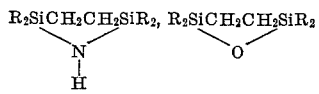

$(R_2SiO)_3$, and an organosilicon compound having an average per silicon atom of 1 to 3 monovalent aliphatic hydrocarbon substituent groups and at least one $\equiv$SiOH group per molecule, any remaining valences of said organosilicon compound being satisfied with substituents selected from the group consisting of divalent oxygen atoms and divalent hydrocarbon radicals, with (2) tetracyanoethylene, where R is a monovalent aliphatic hydrocarbon radical.

2. The method of claim 1 where the monovalent aliphatic hydrocarbon substituent groups are methyl.

3. A method of polymerizing organosilicon compounds containing silicon-bonded hydroxyl radicals, which method comprises contacting (1) an organosilicon compound having an average per silicon atom of 1.98 to 2.00 monovalent aliphatic hydrocarbon substituent groups and an average per molecule of two $\equiv$SiOH groups, any remaining valences of said organosilicon compound being satisfied with substituents selected from the group consisting of divalent oxygen atoms and divalent hydrocarbon radicals, with (2) tetracyanoethylene.

4. The method of claim 3 where the monovalent aliphatic hydrocarbon substituents are methyl.

References Cited by the Examiner
UNITED STATES PATENTS

| | | | |
|---|---|---|---|
| 2,794,824 | 6/1957 | Heckert et al. | 260—465.8 |
| 2,823,218 | 2/1958 | Speier et al. | 260—448.2 |
| 3,086,954 | 4/1963 | Polmanteer et al. | 260—46.5 |
| 3,099,670 | 7/1963 | Prober | 260—46.5 |
| 3,159,662 | 12/1964 | Ashby | 260—46.5 |
| 3,166,584 | 1/1965 | Cairns et al. | 260—465.8 |
| 3,220,972 | 11/1965 | Lamoreaux | 260—46.5 |

LEON J. BERCOVITZ, *Primary Examiner.*

M. I. MARQUIS, *Assistant Examiner.*